United States Patent
Sakamoto et al.

(10) Patent No.: US 9,405,055 B2
(45) Date of Patent: Aug. 2, 2016

(54) LIGHT GUIDE PLATE, LIGHT GUIDE PLATE MANUFACTURING METHOD, AND LIGHT GUIDE PLATE MANUFACTURING APPARATUS

(71) Applicant: Jun Sakamoto, Osaka (JP)

(72) Inventors: Koji Sakamoto, Osaka (JP); Jun Sakamoto, Osaka (JP)

(73) Assignee: Jun Sakamoto, Osaka (JP)

( * ) Notice: Subject to any disclaimer, the term of this patent is extended or adjusted under 35 U.S.C. 154(b) by 0 days.

(21) Appl. No.: 14/045,702

(22) Filed: Oct. 3, 2013

(65) Prior Publication Data

US 2014/0029306 A1    Jan. 30, 2014

Related U.S. Application Data

(63) Continuation of application No. PCT/JP2012/059161, filed on Apr. 4, 2012.

(30) Foreign Application Priority Data

Apr. 4, 2011    (JP) .................................. 2011-082547

(51) Int. Cl.
*F21V 8/00*    (2006.01)
*G02B 6/00*    (2006.01)

(52) U.S. Cl.
CPC ............ *G02B 6/0065* (2013.01); *G02B 6/0011* (2013.01); *G02B 6/0061* (2013.01); *G02B 6/0036* (2013.01)

(58) Field of Classification Search
CPC ... G02B 6/0011; G02B 6/0061; G02B 6/0065
USPC .................. 362/606–607, 615–620
See application file for complete search history.

(56) References Cited

U.S. PATENT DOCUMENTS 6,151,008 A  * 11/2000  Zhang .................... G09G 3/342
                                                          345/102
6,215,936 B1 *  4/2001  Yoshikawa ............... G02B 6/00
                                                          362/302

(Continued)

FOREIGN PATENT DOCUMENTS

JP          03-189679 A      8/1991
JP          05-210014 A      8/1993

(Continued)

OTHER PUBLICATIONS

International Search Report; PCT/JP2012/059161; May 1, 2012.

(Continued)

*Primary Examiner* — Anh Mai
*Assistant Examiner* — Nathaniel Lee
(74) *Attorney, Agent, or Firm* — Studebaker & Brackett PC

(57) ABSTRACT

A light guide plate includes: a light guide member with a light incident surface and first and second principal surfaces; and first and second protrusions formed on at least one of the first and second principal surfaces. When the first principal surface is viewed in a normal direction, a distance between the light incident surface and the second protrusion is larger than a distance between the light incident surface and the first protrusion; each of the first and second protrusions has a shape, a length of which in an orthogonal direction orthogonal to a propagation direction of light incident from the light incident surface increases monotonously in the propagation direction; and a minimum value of the length of the second protrusion in the orthogonal direction is larger than a maximum value of the length of the first protrusion in the orthogonal direction.

11 Claims, 11 Drawing Sheets

(56) References Cited

U.S. PATENT DOCUMENTS

| | | | |
|---|---|---|---|
| 6,923,559 B2 * | 8/2005 | Ng | G02B 6/0061 349/65 |
| 7,661,358 B2 | 2/2010 | Kim et al. | |
| 8,199,279 B2 | 6/2012 | Choi et al. | |
| 2004/0218376 A1 | 11/2004 | Ng et al. | |
| 2007/0186791 A1 | 8/2007 | Kim et al. | |
| 2008/0231590 A1 | 9/2008 | Choi et al. | |
| 2008/0285308 A1 * | 11/2008 | Clary | G02B 6/004 362/619 |

FOREIGN PATENT DOCUMENTS

| | | |
|---|---|---|
| JP | 05-313017 A | 11/1993 |
| JP | 2007-227405 A | 9/2007 |
| JP | 2007-305544 A | 11/2007 |
| JP | 2010-271517 A | 12/2010 |
| KR | 10-2001-0011655 A | 2/2001 |
| KR | 10-2007-0081964 A | 8/2007 |
| KR | 10-2008-0085242 A | 9/2008 |
| WO | 2005/096045 A2 | 10/2005 |
| WO | 2009/032813 A2 | 3/2009 |
| WO | 2011/019785 A1 | 2/2011 |

OTHER PUBLICATIONS

An Office Action issued by the Korean Patent Office on Jan. 19, 2015, which corresponds to Korean Patent Application No. 10-2013-7029178 and is related to U.S. Appl. No. 14/045,702.

The extended European search report issued by the European Patent Office on Jan. 26, 2015, which corresponds to European Patent Application No. 12767526.2-1553 and is related to U.S. Appl. No. 14/045,702.

* cited by examiner

LIGHT GUIDE PLATE, LIGHT GUIDE PLATE MANUFACTURING METHOD, AND LIGHT GUIDE PLATE MANUFACTURING APPARATUS

CROSS REFERENCE TO RELATED APPLICATIONS

The present application is a continuation of International Application No. PCT/JP2012/059161, filed Apr. 4, 2012, which claims priority to Japanese Patent Application No. 2011-082547, filed Apr. 4, 2011. The contents of these applications are incorporated herein by reference in their entirety.

TECHNICAL FIELD

The present invention relates to light guide plates, light guide plate manufacturing methods, and light guide plate manufacturing apparatuses.

BACKGROUND ART

Light guide plates can emit incident light substantially uniformly from a comparatively wide light emitting surface and are therefore employed in liquid crystal display devices, illumination devices, etc. When light from a light source enters a light incident surface on one side of a light guide plate, the light repeats reflection on a pair of principal surfaces of the light guide plate to propagate within the light guide palate in a direction (propagation direction) substantially orthogonal to the light incident surface. The light propagating in the light guide plate is emitted little by little from the light emitting surface by an optical operation as it propagates. It is noted that in typical liquid crystal display devices, a diffuser plate is provided between the light guide plate and a liquid crystal display element, thereby irradiating the light from the light source uniformly to the liquid crystal display element.

It has been known that a pattern of dots, in which the areas of the dots increase away from the light incident surface, is provided on a principal surface of the light guide plate (Patent Literatures 1 and 2). Patent Literature 1 discloses that a pattern of circular dots is formed on an emission surface or a surface opposite to the emission surface. Further, Patent Literature 2 discloses that projections and recesses are formed in an emission surface or a surface opposite to the emission surface with the use of a mold.

CITATION LIST

Patent Literature

[Patent Literature 1] Japanese Patent Application Laid-Open Publication No. 5-313017
[Patent Literature 2] Japanese Patent Application Laid-Open Publication No. 5-210014

SUMMARY OF INVENTION

Technical Problem

The light guide plates in Patent Literatures 1 and 2 may exhibit insufficient diffusion efficiency. For example, a demand for reduction in size of devices is recently increasing more and more. The present inventors have found that it is necessary to further increase the diffusion efficiency of the light guide plate in seeking reduction in thickness of the light guide plate.

The present invention has been made in view of the foregoing and has its object of providing a light guide plate that can exhibit increased diffusion efficiency and a light guide plate manufacturing method and a light guide plate manufacturing apparatus, which are suitable for manufacture of such a light guide plate.

Solution to Problem

A light guide plate according to the present invention includes: a light guide member with a light incident surface, a first principal surface, and a second principal surface; and a plurality of protrusions formed on at least one of the first principal surface and the second principal surface. The plurality of protrusions includes a first protrusion and a second protrusion. When the first principal surface is viewed in a normal direction, a distance between the light incident surface and the second protrusion is larger than a distance between the light incident surface and the first protrusion; each of the first protrusion and the second protrusion has a shape, a length of which in an orthogonal direction orthogonal to a propagation direction of light incident from the light incident surface increases monotonously in the propagation direction; and a minimum value of the length of the second protrusion in the orthogonal direction is larger than a maximum value of the length of the first protrusion in the orthogonal direction.

In one embodiment, when the first principal surface is viewed in the normal direction, each of the first protrusion and the second protrusion is trapezoidal in shape.

In one embodiment, the plurality of protrusions are made of the same material as the light guide member.

In one embodiment, the plurality of protrusions are made of a material different from a material for the light guide member.

In one embodiment, when the first principal surface is viewed in the normal direction, an area of the second protrusion is larger than an area of the first protrusion.

In one embodiment, when the first principal surface is viewed in the normal direction, the first protrusion and the second protrusion are arranged so that respective centers of the first protrusion and the second protrusion are aligned in the propagation direction.

In one embodiment, the light incident surface includes a first light incident surface and a second light incident surface different from the first light incident surface. When the first principal surface is viewed in the normal direction, protrusions of the plurality of protrusions, which are closer to the first light incident surface than the second light incident surface, each has a shape, a length of which in a direction orthogonal to a first propagation direction of first incident light incident from the first light incident surface increases monotonously in the first propagation direction. When the first principal surface is viewed in the normal direction, protrusions of the plurality of protrusions, which are closer to the second light incident surface than the first light incident surface, each has a shape, a length of which in a direction orthogonal to a second propagation direction of second incident light incident from the second light incident surface increases monotonously in the second propagation direction.

A light guide plate manufacturing apparatus according to the present invention includes a printing roll and a transfer roll. A plurality of recesses including a first recess and a second recess are formed in a surface of the printing roll. The first recess and the second recess are aligned in a predetermined direction. Each of the first recess and the second recess has a shape, a length of which in an orthogonal direction orthogonal to the predetermined direction increases monotonously in the predetermined direction. When the surface of the printing roll is viewed in a normal direction, a minimum value of the length of the second recess in the orthogonal direction is larger than a maximum value of the length of the first recess in the orthogonal direction.

A light guide plate manufacturing method according to the present invention includes: preparing a light guide member with a light incident surface, a first principal surface, and a second principal surface; and printing a plurality of protrusions on at least one of the first principal surface and the second principal surface of the light guide member by gravure offset printing. In the printing, the plurality of protrusions include a first protrusion and a second protrusion. When the first principal surface is viewed in a normal direction, a distance between the light incident surface and the second protrusion is larger than a distance between the light incident surface and the first protrusion, each of the first protrusion and the second protrusion has a shape, a length of which in an orthogonal direction orthogonal to a propagation direction of light incident from the light incident surface increases monotonously in the propagation direction, and a minimum value of the length of the second protrusion in the orthogonal direction is larger than a maximum value of the length of the first protrusion in the orthogonal direction.

Advantageous Effects of Invention

According to the present invention, diffusion efficiency of the light guide plate can be increased.

DESCRIPTION OF EMBODIMENTS

A light guide plate, a light guide plate manufacturing method, and a light guide manufacturing apparatus according to embodiments of the present invention will be described below with reference to the accompanying drawings. It should be noted that the present invention is not limited to the following embodiments.

Figure 1A:
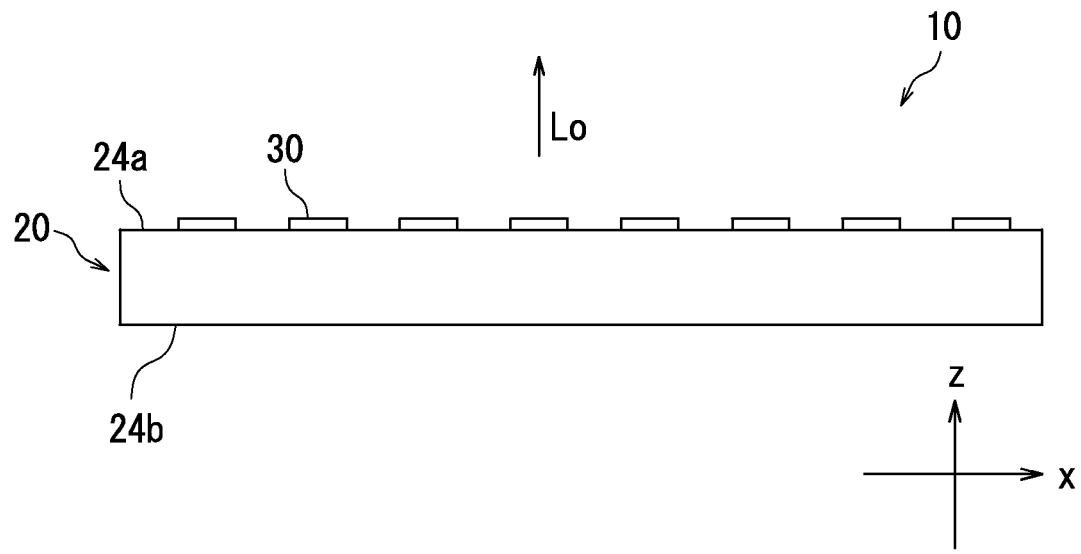
FIG. 1A is a schematic cross sectional view of a light guide plate according to one embodiment of the present invention.
Figure 1B:
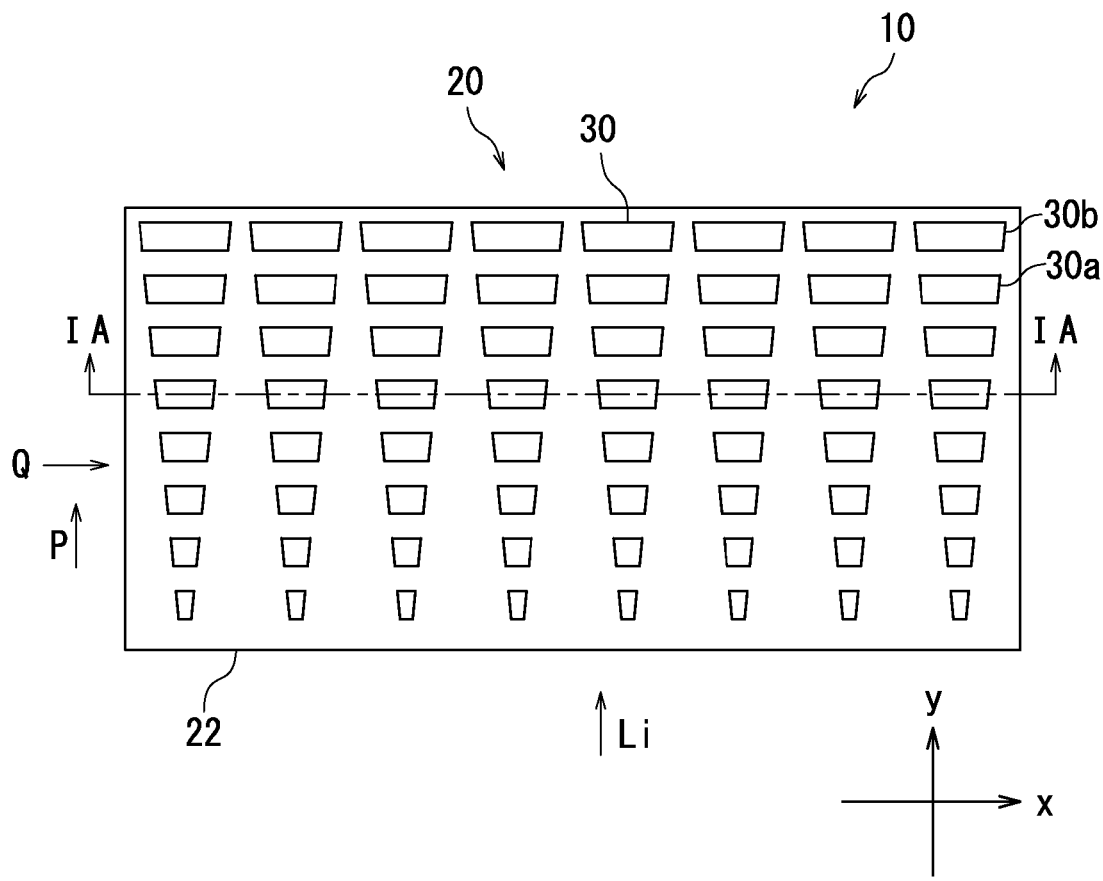
FIG. 1B is a schematic top view of FIG. 1A.

A light guide plate 10 according to one embodiment of the present invention will be described with reference to FIG. 1. FIGS. 1A and 1B are a schematic cross sectional view and a schematic top view, respectively, showing a light guide plate 10 according to the present embodiment. FIG. 1A shows a cross section taken along the line IA-IA in FIG. 1B The light guide plate 10 includes a light guide member 20 and a plurality of protrusions 30. The light guide member 20 has a light incident surface 22 and principal surfaces 24a and 24b. Here, both the principal surfaces 24a and 24b of the light guide member 20 are substantially planar. The light guide member 20 has a substantially constant thickness. Typically, the areas of the principal surfaces 24a and 24b of the light guide member 20 are the same.

The light guide member 20 is made of acrylic resin, for example. The light incident surface 22 of the light guide member 20 faces a light source (not shown in FIG. 1). Light from the light source enters the interior of the light guide member 20 from the light incident surface 22 of the light guide member 20 and propagates in a propagation direction P, as indicated by the arrow Li in FIG. 1B. In the process of propagation of the light in the light guide member 20 in the propagation direction P, the light is emitted from the principal surface 24a of the light guide member 20, as indicated by the allow Lo in FIG. 1A. It is noted that in the following description of the present specification, the principal surfaces 24a and 24b may be referred to as a first principal surface 24a and a second principal surface 24b, respectively.

The protrusions 30 are formed on at least one of the first principal surface 24a and the second principal surface 24b of the light guide member 20. In the light guide plate 10 shown in FIG. 1, the protrusions 30 are formed on the principal surface 24a of the light guide member 20. The protrusions 30 herein are made of a material different from the material for the light guide member 20. Accordingly, the refractive index changes in the interface between the principal surface 24a of the light guide member 20 and each protrusion 30.

The protrusions 30 are made of acryl based resin, for example. Alternatively, the protrusions 30 may be made of polyimide based resin. Or, the protrusions 30 may include beads. For example, the beads are made of amorphous silica or acryl and have an average particle size of about 1 μm.

Here, the light entering the interface between the light guide member 20 and each protrusion 30 at the principal surface 24a of the light guide member 20 diffuses in the interface between the light guide member 20 and each protrusion 30. Further, the light diffuses in the interface between each protrusion 30 and a substance (typically air) around the light guide member 20 and the protrusions 30. In the light guide plate 10 of the present embodiment, the protrusions 30 are different in size according to their positions on the principal surface 24a. The areas of the protrusions 30 when the principal surface 24a is viewed in the normal direction are set so as to be increasingly large away from the light incident surface 22. In general, light incident in a light incident surface of a light guide plate is emitted from the light guide plate to be decreased as the propagation length becomes long. Accordingly, the intensity of the light emitted from the light guide plate decreases away from the light incident surface. However, in the light guide plate 10 of the present embodiment, the protrusions 30 are arranged so that the areas increase away from the light incident surface 22. Thus, the intensity of the light from the light guide plate 10 can be uniformed.

Further, the protrusions 30 herein are arranged in the propagation direction P. Specifically, when the principal surface 24a of the light guide member 20 is viewed in the normal direction, the respective centers of the protrusions 30 are linearly aligned substantially in the propagation direction P. For example, the distance between the respective centers of adjacent sets of linearly aligned protrusions 30 is substantially equal to the length of the largest protrusion 30 in the x direction.

For example, the length of the smallest protrusion 30 in the x direction is 20 μm, while the length of the largest protrusion 30 in the x direction is 120 μm. Further, the length (width) of each protrusion 30 in the y direction is 50 μm or larger and 150 μm or smaller, for example. All the protrusions 30 may have the same length (width) in the y direction. Furthermore, the thickness (length in the z direction) of the protrusions 30 is preferably 2 μm or larger and 6 μm or smaller, and more preferably 3 μm or larger and 5 μm or smaller, for example. Although description will be made later in detail, such minute protrusions can be formed suitably by gravure offset printing. The minute protrusions 30 can appropriately diffuse light, so that a diffuser plate can be dispensed with.

The focus will be placed herein upon two adjacent protrusions 30a and 30b aligned in a single straight line (straight line in the y direction). When the principal surface 24a of the light guide member 20 is viewed in the normal direction, the distance between the protrusion 30b and the light incident surface 22 is larger than the distance between the protrusion 30a and the light incident surface 22. Herein, each of the protrusions 30a and 30b is trapezoidal in shape. It is noted that in the following description of the present specification, the protrusions 30a and 30b may be referred to as a first protrusion 30a and a second protrusion 30b, respectively.

As described above, the protrusion 30a and the protrusion 30b are arranged so that the respective centers of the protrusion 30a and the protrusion 30b are aligned in the propagation direction P of the light incident from the light incident surface 22. When the principal surface 24a of the light guide member 20 is viewed in the normal direction, each of the first and second protrusions 30a and 30b has a shape, the length of which in an orthogonal direction Q orthogonal to the propagation direction P of the light increases monotonously in the propagation direction P. Accordingly, in the light guide plate 10 according to the present embodiment, even when attention is directed locally to the vicinity of each protrusion 30 as well as to the principal surface 24a as a whole, the areas of the protrusions 30 increase away from the light incident surface 22. Thus, the intensity of the light emitted from the light guide plate 10 can be further uniformed.

Moreover, in the light guide plate 10 according to the present embodiment, the minimum value of the length of the protrusion 30b in the orthogonal direction Q is larger than the maximum value of the length of the protrusion 30a in the orthogonal direction Q. Accordingly, in the light guide plate 10 of the present embodiment, even when attention is directed locally to the vicinity of adjacent two protrusions 30, as well as to the principal surface 24a as a whole, the area of the region where each protrusion 30 is formed increases away from the light incident surface 22. Accordingly, the intensity of the light emitted from the light guide plate 10 can be further uniformed. Arrangement of the protrusions 30 as above can increase the diffusion efficiency of the light guide plate 10 of the present embodiment.

Figure 2:
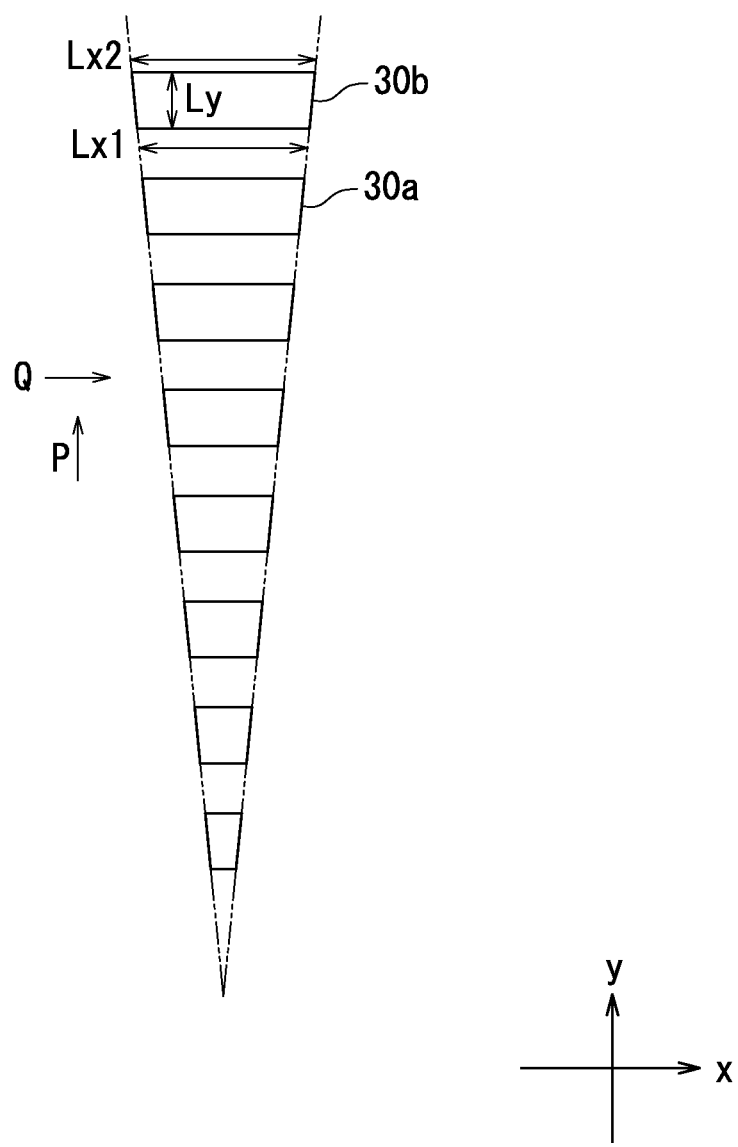
FIG. 2 is a schematic enlarged view of the light guide plate according to the present embodiment.

FIG. 2 is an enlarged view of protrusions 30 in one row. Each of the protrusions 30 is trapezoidal in shape. Lateral sides of each individual protrusion 30 are aligned in the same straight lines. As described above, the protrusion 30b has a shape, the length of which in the orthogonal direction Q orthogonal to the light propagation direction P increases monotonously in the propagation direction P. The minimum value and the maximum value of the length in the orthogonal direction Q (x direction) are denoted by Lx1 and Lx2, respectively.

It is noted that the length of at least one of the protrusions 30 in the propagation direction P (y direction) is smaller than the maximum value of the length thereof in the orthogonal direction Q (x direction). Further, preferably, the length of the one protrusion 30 in the propagation direction P (y direction) is smaller than the minimum value of the length thereof in the orthogonal direction Q (x direction). For example, as shown in FIG. 2, the length Ly of the protrusion 30b in the propagation direction P (y direction) is smaller than Lx1 and Lx2.

Figure 3A:
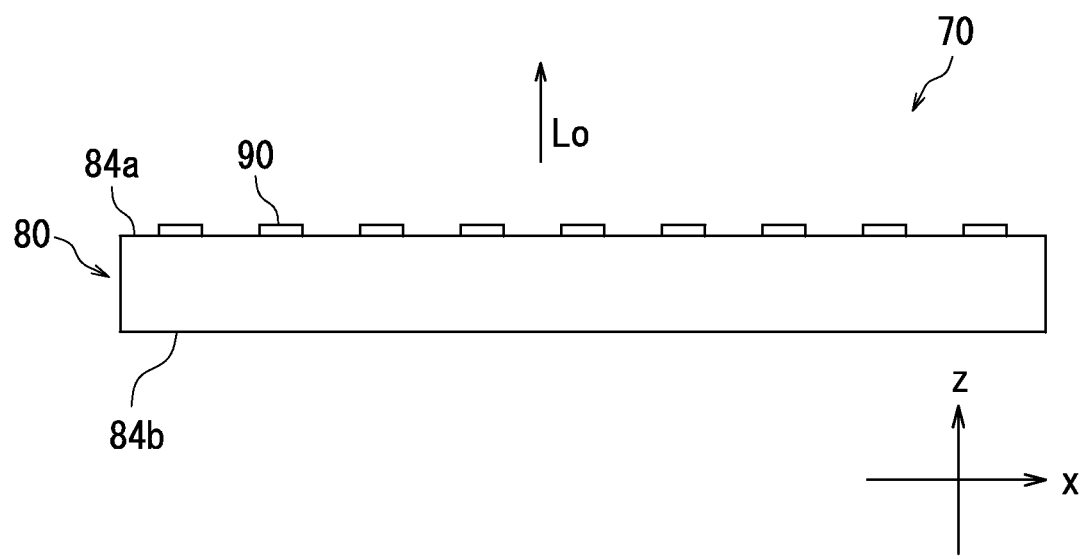
FIG. 3A is a schematic cross sectional view of a light guide plate according to Comparative Example.
Figure 3B:
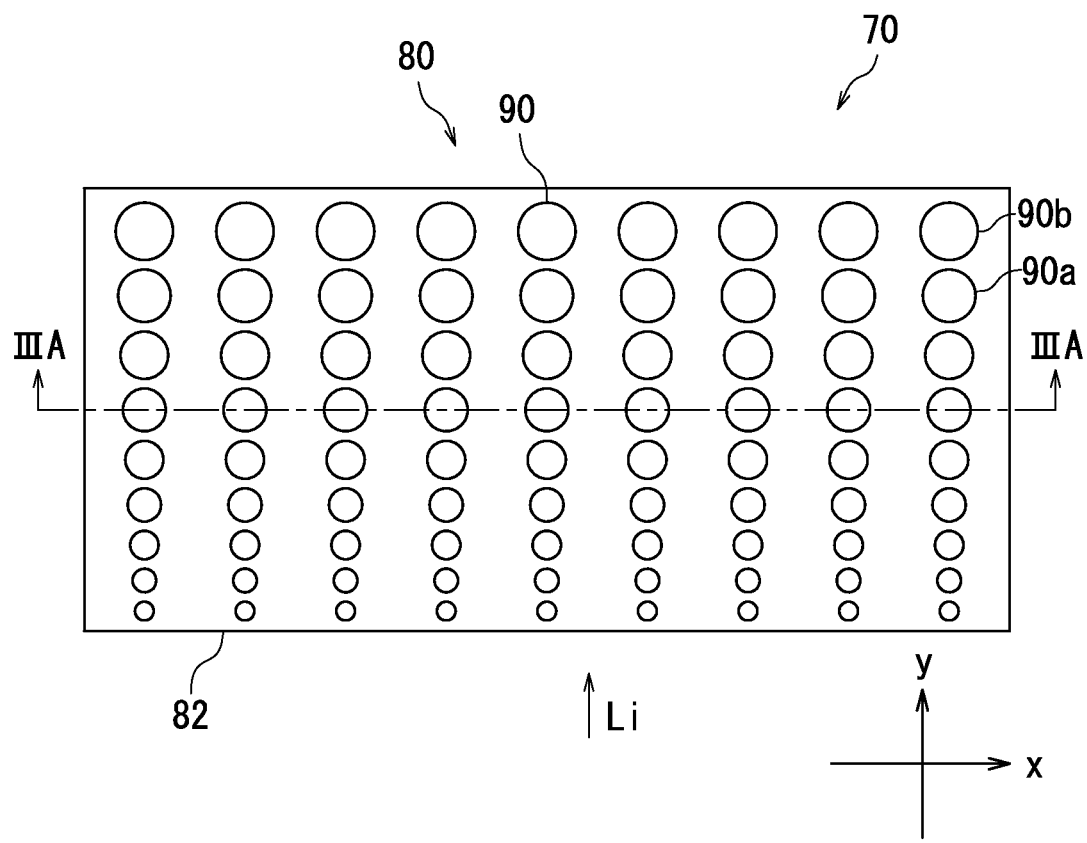
FIG. 3B is a top schematic view of FIG. 3A.

Comparison will be made below between the light guide plate according to the present embodiment and a light guide plate according to Comparative Example. A light guide plate 70 according to Comparative Example will be described with reference to FIG. 3. FIGS. 3A and 3B are a schematic cross sectional view and a schematic top view of the light guide plate 70, respectively.

The light guide plate 70 includes a light guide member 80 and protrusions 90. The light guide member 80 has a light incident surface 82 and principal surfaces 84a and 84b. The protrusions 90 are formed on the principal surface 84a of the light guide member 80. When the principal surface 84a of the light guide member 80 is viewed in the normal direction, each protrusion 90 is circular in shape. The areas of the protrusions 90 increase away from the light incident surface 82.

The areas of the protrusions 90 increase away from the light incident surface 82 also in the light guide plate 70 in Comparative Example to obtain uniform emitted light. However, in the light guide plate 70 of Comparative Example, where the light guide member 80 is reduced in thickness, irregularity in light from the light guide plate 70 may be observed. For example, when the light guide member 80 was reduced in thickness from 4 mm to 2.5 mm, light irregularity was observed in light guide plate 70. By contrast, in the light guide plate 10 according to the present embodiment, even when the light guide member 20 was reduced in thickness to 2.5 mm, no light irregularity was observed.

Figure 4A:
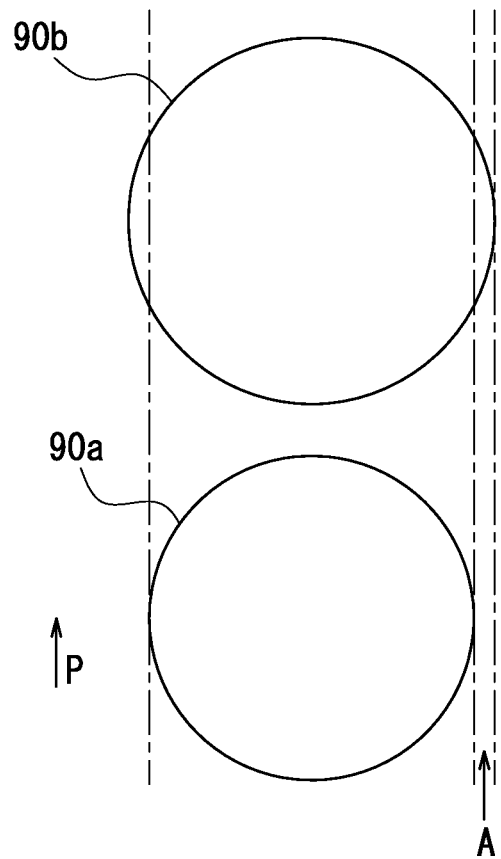
FIG. 4A is a schematic enlarged partial view of the light guide plate according to Comparative Example.

The detailed reason thereof is not clear but may be considered as follows. FIG. 4A shows two protrusions 90a and 90b of the light guide plate 70 in Comparative Example. When the principal surface 84a of the light guide member 80 is viewed in the normal direction, the distance between the light incident surface 82 and the protrusion 90b is larger than the distance between the light incident surface 82 and the protrusion 90a. The diameter of the protrusion 90b is larger than that of the protrusion 90a.

Figure 4B:
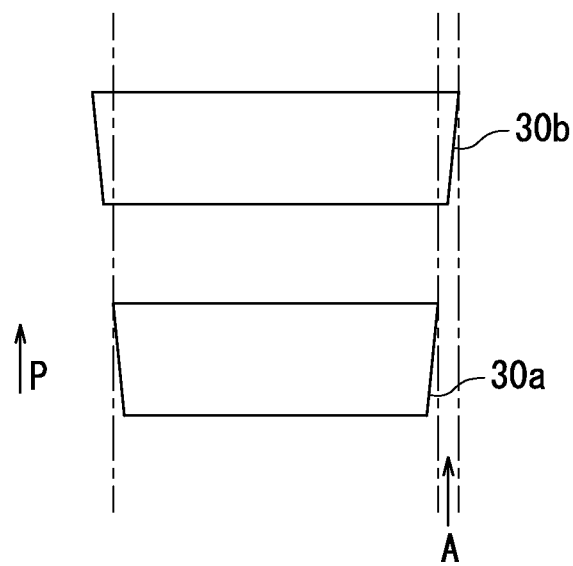
FIG. 4B is a schematic enlarged partial view of the light guide plate according to the present embodiment.

FIG. 4B is a schematic enlarged partial view of the light guide plate 10 according to the present embodiment. The focus will be placed herein also upon the two protrusions 30a and 30b aligned in the propagation direction P. Here, attention is directed to regions A, in which light propagating in the propagation direction P from the light incident surfaces 22 and 82 does not travel over the corresponding protrusions 30a and 90a but travels over the corresponding protrusions 30b and 90b when the principal surfaces 24a and 84a of the respective light guide plates 10 and 70 are viewed in the normal direction. In the light guide plate 70 of Comparative Example, it is required to form the protrusion 90b having a relatively large area in order to reserve the region A. By contrast, in the light guide plate 10 of the present embodiment, the area of the protrusion 30b can be set relatively small for reservation of the region A. For this reason, an increase in diffusion efficiency might be achieved in the light guide plate 10 of the present embodiment.

Figure 5:
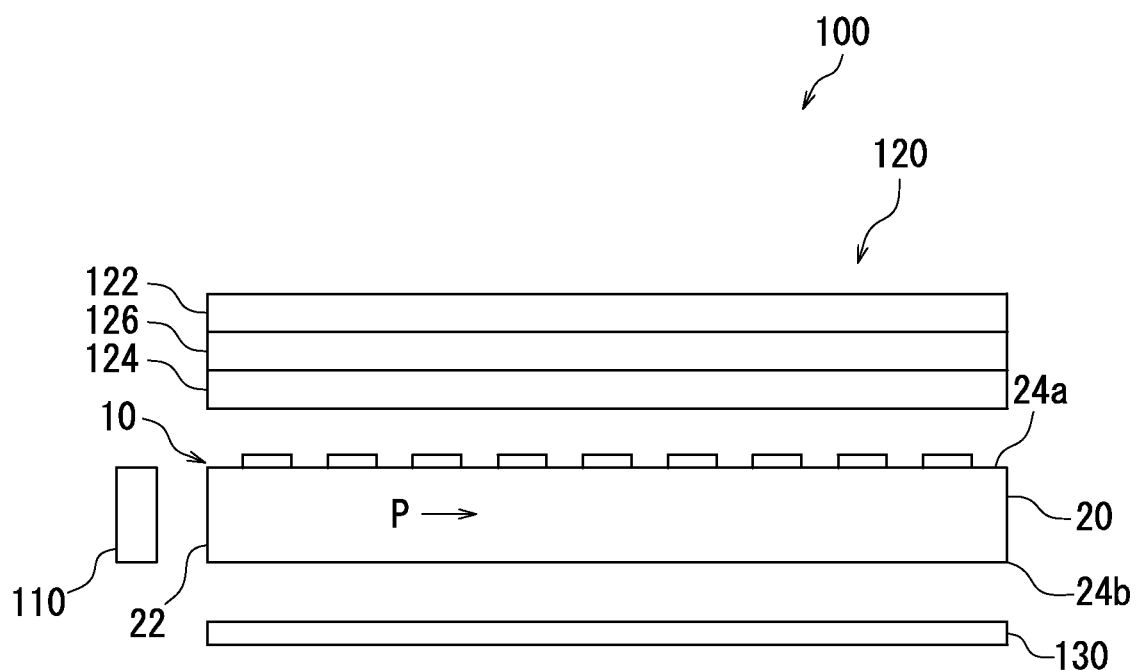
FIG. 5 is a schematic illustration of a liquid crystal display device including the light guide plate shown in FIG. 1.

Such the light guide plate 10 can be suitably employed in liquid crystal display devices. With reference to FIG. 5, description will be made about a liquid crystal display device 100.

FIG. 5 is a schematic illustration of the liquid crystal display device 100 including the light guide plate 10. The liquid crystal display device 100 includes a light source 110 and a liquid crystal display element 120 in addition to the light guide plate 10. The liquid crystal display element 120 is arranged on the side of the principal surface 24a of the light guide member 20 of the light guide plate 10. It is noted that although a diffuser plate is dispensed with because the light guide plate 10 has a high diffusing function as described above, the diffuser plate may be provided between the light guide plate 10 and the liquid crystal display element 120 as needed.

The liquid crystal display element 120 includes a front substrate 122, a back substrate 124, and a liquid crystal layer 126 provided between the front substrate 122 and the back substrate 124. Although not shown herein, the front substrate 122 and the back substrate 124 each are provided with an electrode, an insulating layer, a color filter, and the like, as needed.

Light emitted from the light source 110 enters the light incident surface 22 of the light guide plate 10 and propagates in the interior of the light guide plate 10 in the propagation direction P. In the light guide plate 10, the light is emitted toward the liquid crystal display element 120 from the principal surface 24a of the light guide member 20. The liquid crystal display element 120 modulates the light emitted from the light source 110 through the light guide plate 10, thereby performing desired display.

It is noted that the liquid crystal display device 100 may further include a reflector plate 130. The reflector plate 130 reflects the light emitted outward from the principal surface 24b of the light guide member 20 to return the light to the light guide member 20. Thus, utilization efficiency of the light emitted from the light source 110 can be increased.

It is noted that although the liquid crystal display device 100 including the light guide plate 10 is described as one example herein, utilization of the light guide plate 10 is not limited to the liquid crystal display devices. For example, the light guide plate 10 may be employed in illumination devices. Alternatively, the light guide plate 10 may be employed in any other devices.

Although the protrusions 30 are made of a material different from the material for the light guide member 20 in the above description, the present invention is not limited to this. The protrusions 30 may be made of almost the same material as the light guide member 20.

Figure 6:
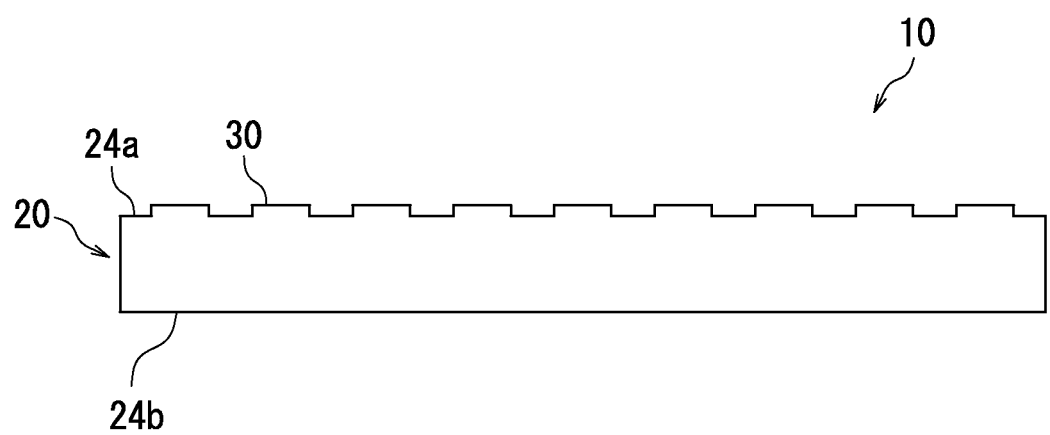
FIG. 6 is a schematic cross sectional view of the light guide plate according to the present embodiment.

FIG. 6 is a schematic illustration of a light guide plate 10 according to the present embodiment. The protrusions 30 herein are made of almost the same material as the light guide member 20. Accordingly, the refractive index changes little in the interface between the principal surface 24a of the light guide member 20 and each protrusion 30. However, since the protrusions 30 are formed on the principal surface 24a of the light guide member 20, light diffuses in the interface between each protrusion 30 and a substance (typically, air) around the light guide member 20 and the protrusions 30. It is noted that in this light guide plate 10, the protrusions 30 may be formed integrally with the light guide member 20. Such the light guide plate 10 can be suitably manufactured using a mold.

As described above, the protrusions 30 may be made of the same material as the light guide member 20 or another material. However, where the protrusions 30 are made of a material different from the material for the light guide member 20, a great advantage in diffusion can be achieved. The refractive index of the protrusions 30 is preferably higher than the refractive index of the light guide member 20. However, the refractive index of the protrusions 30 may be lower than the refractive index of the light guide member 20.

It is noted that the protrusions 30 are formed on the principal surface 24a of the light guide member 20 in the above description, which however, should not be taken to limit the present invention. The protrusions 30 may be formed on the principal surface 24b of the light guide member 20.

Figure 7:
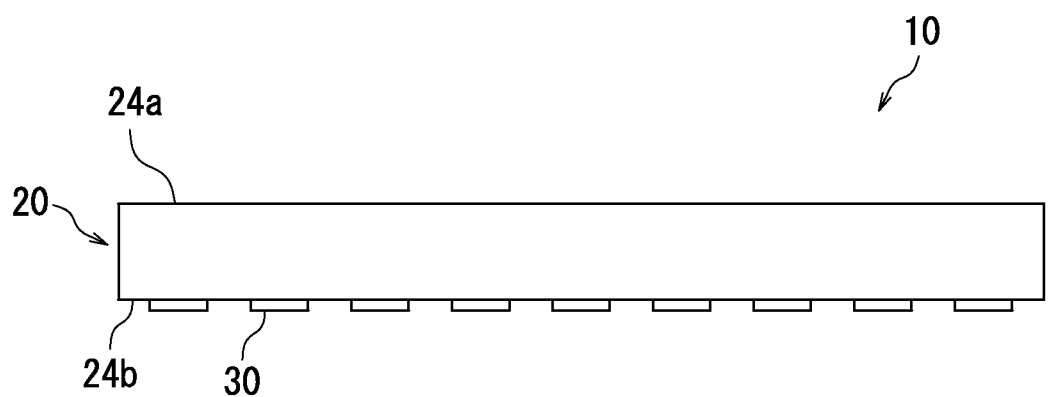
FIG. 7 is a schematic cross sectional view of the light guide plate according to the present embodiment.

FIG. 7 is a schematic illustration of a light guide plate 10 according to the present embodiment. The protrusions 30 herein are formed on the principal surface 24b of the light guide member 20. It is noted that the protrusions 30 may be made of a material different from the material for the light guide member 20 or made of almost the same material as the light guide member 20.

As shown, the protrusions 30 may be formed on one of the principal surface 24a and the principal surface 24b. Alternatively, though not shown, the protrusions 30 may be formed on each of the principal surface 24a and the principal surface 24b.

It is noted that the light guide member 20 has a substantially constant thickness in the above description, which however, should not be taken to limit the present invention. The light guide member 20 may vary in thickness according to position. For example, the light guide member 20 may become thin away from the light incident surface 22. Further, the areas of the principal surfaces 24a and 24b are substantially the same in the above description, which however, should not be taken to limit the present invention. The principal surfaces 24a and 24b may be different in area from each other.

The light incident surface 22 is provided on one side surface of the light guide member 20 in the above description, which however, should not be taken to limit the present invention.

Figure 8:
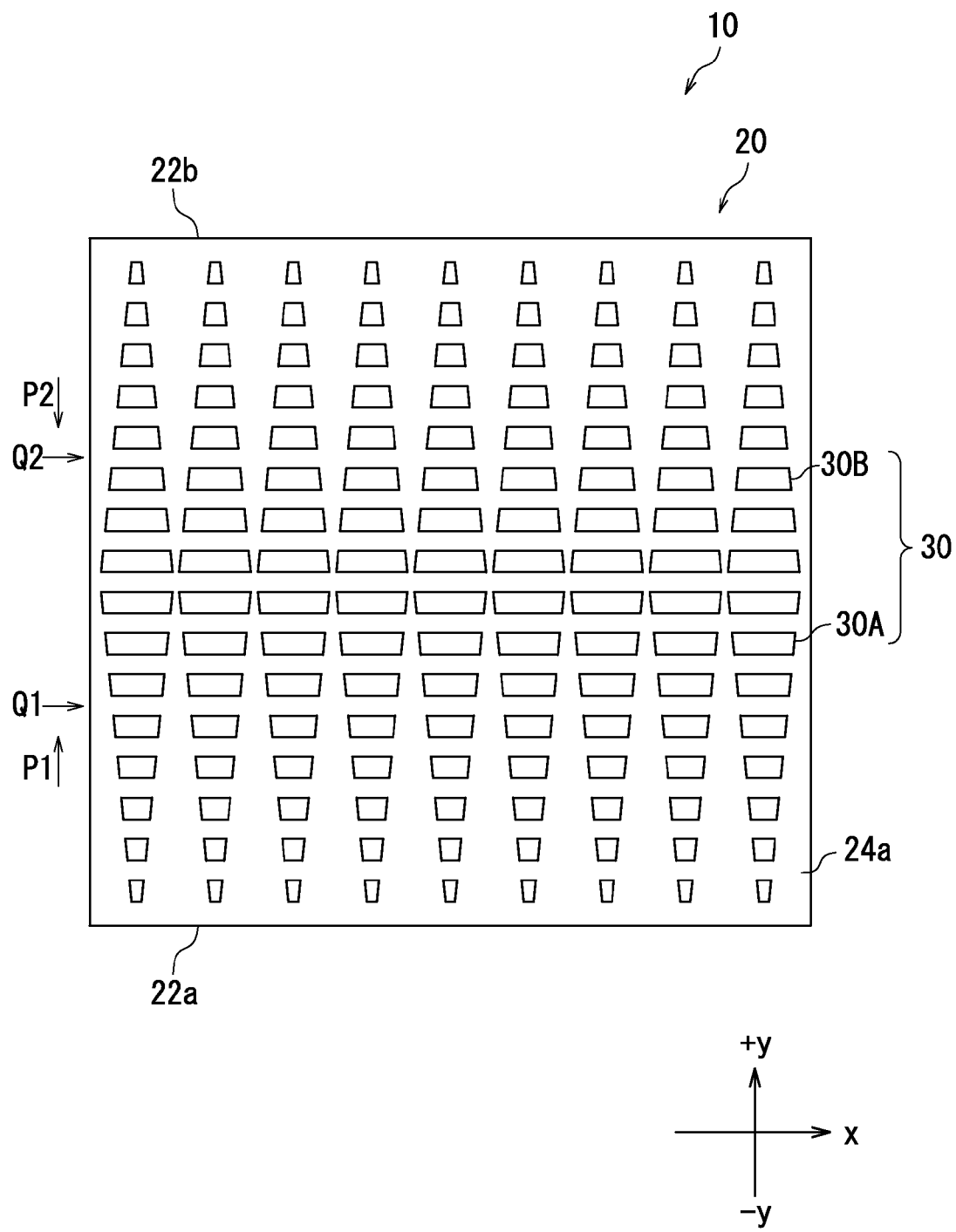
FIG. 8 is a schematic top view of the light guide plate according to the present embodiment.

FIG. 8 is a schematic illustration of a light guide plate 10. Light enters the light guide member 20 from each of the light incident surface 22a and the light incident surface 22b. For example, the light incident surface 22a is formed at the side of the light guide member 20 in the negative y direction, while the light incident surface 22b is formed at the side of the light guide member 20 in the positive y direction. It is noted that in the following description of the present specification, the light incident surfaces 22a and 22b may be referred to as a first light incident surface 22a and a second light incident surface 22b, respectively. Further, light incident from the first light incident surface 22a and light incident from the second light incident surface 22b may be referred to as first incident light and second incident light, respectively.

Here, when the principal surface 24a is viewed in the normal direction, protrusions of the protrusions 30, which are closer to the first light incident surface 22a than the second light incident surface 22b, may be referred to as protrusions 30A (first protrusion group 30A). Also, protrusions of the protrusions 30, which are closer to the light incident surface 22b than the light incident surface 22a, may be referred to as protrusions 30B (second protrusion group 30B). Each protrusion 30A has a shape, the length of which in an orthogonal direction Q1 orthogonal to a propagation direction P1 of the first incident light increases monotonously in the propagation direction P1. Each protrusion 30B has a shape, the length of which in an orthogonal direction Q2 orthogonal to a propagation direction P2 of the second incident light increases monotonously in the propagation direction P2.

As described above, the light guide plate 10 may be formed using a mold, for example. In this case, typically, the protrusions 30 are made of the same material as the light guide member 20. Alternatively, the protrusions 30 may be formed on the light guide member 20 by gravure offset printing, screen printing, or stamp printing. Or, they may be formed by another scheme. It is noted that the protrusions 30 of the light guide plate 10 are preferably formed by gravure offset printing.

Figure 9A:
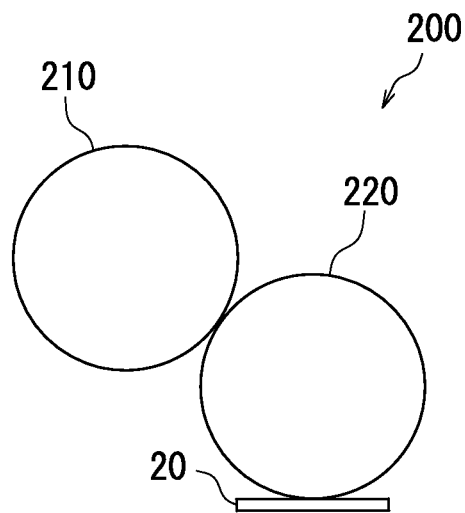
FIG. 9A is a schematic illustration of a light guide plate manufacturing apparatus according to one embodiment of the present invention.
Figure 9B:
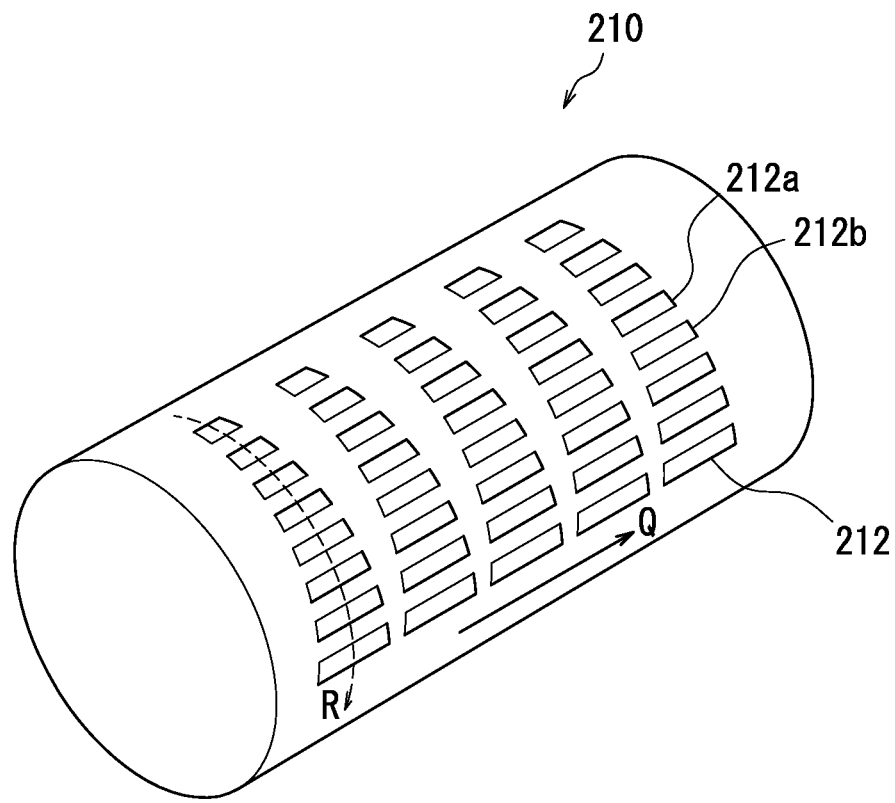
FIG. 9B is a schematic illustration of a printing roll in the light guide plate manufacturing apparatus of FIG. 9A.
Figure 10:
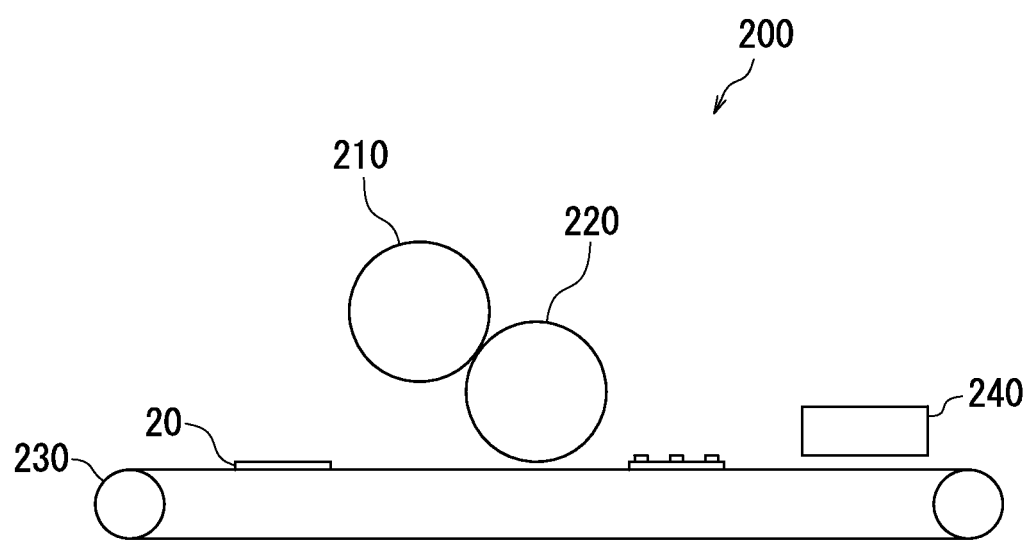
FIG. 10 is a schematic illustration of the light guide plate manufacturing apparatus according to the present embodiment.

With reference to FIGS. 9 and 10, a light guide plate manufacturing apparatus according to the present embodiment of the present disclosure will be described below. FIG. 9A is a schematic illustration of a light guide plate manufacturing apparatus 200 according to the present embodiment. The light guide plate manufacturing apparatus 200 manufactures the light guide plate 10 by gravure offset printing. In the following description, the light guide plate manufacturing apparatus 200 may be merely referred to as a manufacturing device 200.

The manufacturing apparatus 200 includes a printing roll 210 and a transfer roll 220. The printing roll 210 and the transfer roll 220 are rotatable. Here, the diameters of the printing roll 210 and the transfer roll 220 are substantially the same.

The surface of the printing roll 210 is subjected to metal plating. Typically, grooves in a predetermined pattern are formed in the printing roll 210. This pattern corresponds to lines, figures, design, or the like to be printed on the light guide member 20. A blanket is provided on the surface of the transfer roll 220. Typically, the blanket is made of rubber. For example, the blanket is made of silicone rubber.

Printing is performed by rotating both the printing roll 210 and the transfer roll 220. Ink is transferred from the printing roll 210 to the light guide member 20 via the transfer roll 220. In this manner, ink printing is performed.

FIG. 9B is a schematic illustration of the printing roll 210. A plurality of recesses 212 are formed in the surface of the printing roll 210. The focus will be placed herein upon adjacent two recesses 212a and 212b. In the following description of the present specification, the recesses 212a and 212b may be referred to as a first recess 212a and a second recess 212b, respectively.

The first recess 212a and the second recess 212b are aligned in a direction R. When the surface of the printing roll 210 is viewed in the normal direction, each of the recesses 212a and 212b has a shape, the length of which in the orthogonal direction Q orthogonal to the direction R increases monotonously in the direction R. When the surface of the printing roll 210 is viewed in the normal direction, the minimum value of the length of the recess 212b in the orthogonal direction Q is larger than the maximum value of the length of the recess 212a in the orthogonal direction Q.

It is noted that in FIG. 9B, the recesses 212a and 212b, which are arranged linearly, are aligned in the direction R parallel to the rotation direction of the printing roll 21, which however, should not be taken to limit the present invention. The direction R in which the linearly arranged recesses 212a and 212b are arranged may be parallel to the direction of the generating line of the columnar printing roll 210.

The light guide member 20 is preferably conveyed to the site of the printing roll 210 and the transfer roll 220 in the manufacturing apparatus 200. For example, as shown in FIG. 10, the manufacturing apparatus 200 may further include a conveyance section 230 to convey the light guide member 20. The conveyance section 230 herein is a conveyor. The conveyor 230 conveys the light guide member 20 toward the fixed printing roll 210 and the fixed transfer roll 220. The manufacturing apparatus 200 may further includes a dryer 240 to dry the ink.

Figure 11A:
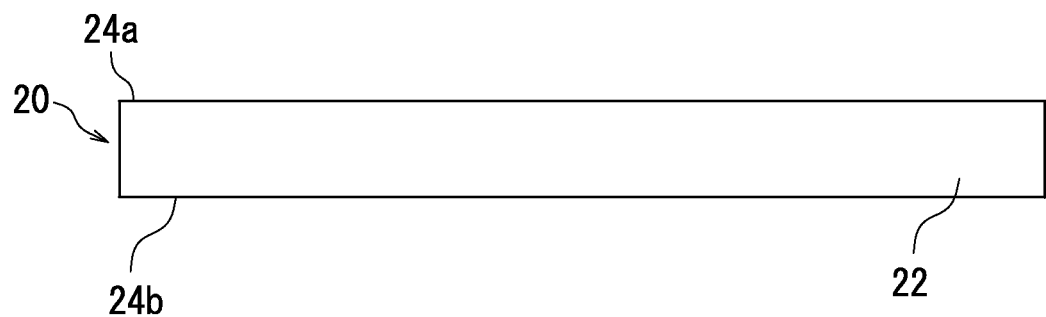
FIGS. 11A and 11B are schematic illustrations for explaining a light guide plate manufacturing method according to the present invention.

With reference to FIGS. 9-11, one example of a method for manufacturing the light guide plate 10 will be described below. As shown in FIG. 11A, the light guide member 20 with the light incident surface 22 and the principal surfaces 24a and 24b is prepared.

Figure 11B:
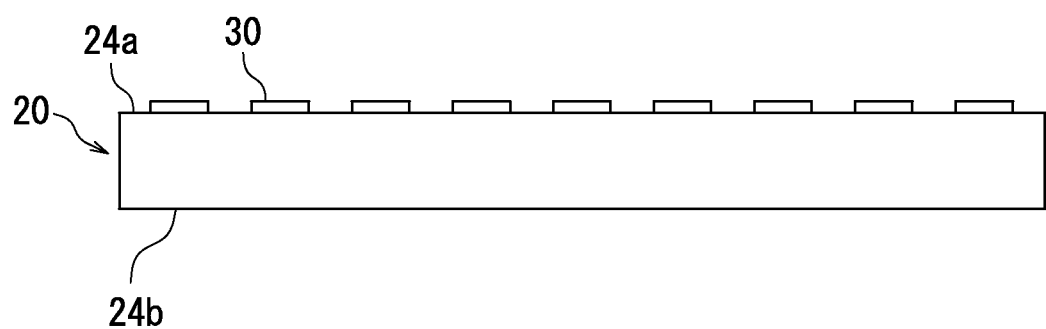

As shown in FIG. 11B, ink is printed on the principal surface 24a of the light guide member 20 by gravure offset printing to form the plurality of protrusions 30. For example, the protrusions 30 may be made of acrylic resin. It is noted that although the plurality of protrusions 30 herein are printed on the principal surface 24a of the light guide member 20, the plurality of protrusions 30 may be printed on the principal surface 24b of the light guide member 20 or on both the principal surfaces 24a and 24b.

Typically, the light guide member 20 is made of acrylic resin having high hardness. Further, typically, in the manufacturing apparatus 200, the printing roll 210 is made of metal, while the transfer roll 220 is made of resin. Accordingly, since the transfer roll 220, rather than the printing roll 210, comes in direct contact with the light guide member 20 in the manufacturing apparatus 200, a physical impact on the acrylic resin can be reduced.

Thus, the light guide plate 10 is preferably manufactured by gravure offset printing. Gravure offset printing can reduce the amount of use of the material for the protrusions 30 and can form the protrusions 30 easily at high speed. Further, gravure offset printing can obtain the minute protrusions 30 and can form the protrusions 30 with a material different from the material for the light guide member 20. However, even in gravure offset printing, the protrusions 30 may be made of almost the same material as the light guide member 20.

INDUSTRIAL APPLICABILITY

According to the present invention, the diffusion efficiency of the light guide plate can be increased. The above light guide plate may be suitably employed in liquid crystal display devices and illumination devices.

REFERENCE SINGS LIST 10 light guide plate
20 light guide member
30 protrusion
100 liquid crystal display device
110 light source
120 liquid crystal display element
130 reflector plate
200 light guide plate manufacturing apparatus
210 printing roll
220 transfer roll
230 conveyance section
240 dryer

What is claimed is:
1. A light guide plate, comprising:
 a light guide member with a light incident surface, a first principal surface, and a second principal surface; and
 a plurality of protrusions formed on at least one of the first principal surface and the second principal surface, wherein the plurality of protrusions includes a first protrusion and a second protrusion, when the first principal surface is viewed in a normal direction, a distance between the light incident surface and the second protrusion is larger than a distance between the light incident surface and the first protrusion, a length of each of the first protrusion and the second protrusion in an orthogonal direction orthogonal to a propagation direction of light incident from the light incident surface increases monotonously in the propagation direction, and a minimum value of the length of the second protrusion in the orthogonal direction is larger than a maximum value of the length of the first protrusion in the orthogonal direction, the first protrusion and the second protrusion each has a trapezoidal shape, the first protrusion has an upper side, a lower side, a right side, and a left side, the upper side and the lower side of the first protrusion being parallel to each other, the second protrusion has an upper side, a lower side, a right side, and a left side, the upper side and the lower side of the second protrusion being parallel to each other, the right side of the first protrusion is aligned with the right side of the second protrusion, and the left side of the first protrusion is aligned with the left side of the second protrusion.

2. The light guide plate of claim 1, wherein
the plurality of protrusions are made of the same material as the light guide member.

3. The light guide plate of claim 1, wherein
the plurality of protrusions are made of a material different from a material for the light guide member.

4. The light guide plate of claim 1, wherein
when the first principal surface is viewed in the normal direction, an area of the second protrusion is larger than an area of the first protrusion.

5. The light guide plate of claim 4, wherein
when the first principal surface is viewed in the normal direction, the first protrusion and the second protrusion are arranged so that respective centers of the first protrusion and the second protrusion are aligned in the propagation direction.

6. The light guide plate of claim 1, wherein
the light incident surface includes a first light incident surface and a second light incident surface different from the first light incident surface, when the first principal surface is viewed in the normal direction, protrusions of the plurality of protrusions, which are closer to the first light incident surface than the second light incident surface, each has a shape, a length of which in a direction orthogonal to a first propagation direction of first incident light incident from the first light incident surface increases monotonously in the first propagation direction, and when the first principal surface is viewed in the normal direction, protrusions of the plurality of protrusions, which are closer to the second light incident surface than the first light incident surface, each has a shape, a length of which in a direction orthogonal to a second propagation direction of second incident light incident from the second light incident surface increases monotonously in the second propagation direction.

7. The light guide plate of claim 1, wherein
a distance between the upper side and the lower side of the first protrusion is equal to a distance between the upper side and the lower side of the second protrusion.

8. A light guide plate manufacturing apparatus, comprising a printing roll and a transfer roll, wherein
a plurality of recesses including a first recess and a second recess are formed in a surface of the printing roll, the first recess and the second recess are aligned in a predetermined direction, a length of each of the first recess and the second recess in an orthogonal direction orthogonal to the predetermined direction increases monotonously in the predetermined direction, when the surface of the printing roll is viewed in a normal direction, a minimum value of the length of the second recess in the orthogonal direction is larger than a maximum value of the length of the first recess in the orthogonal direction, the first recess and the second recess each has a trapezoidal shape, the first recess has an upper side, a lower side, a right side, and a left side, the upper side and the lower side of the first recess being parallel to each other, the second recess has an upper side, a lower side, a right side, and a left side, the upper side and the lower side of the second recess being parallel to each other, the right side of the first recess is aligned with the right side of the second recess, and the left side of the first recess is aligned with the left side of the second recess.

9. The light guide plate manufacturing apparatus according to claim 8, wherein
a distance between the upper side and the lower side of the first recess is equal to a distance between the upper side and the lower side of the second recess.

10. A light guide plate manufacturing method, comprising:
preparing a light guide member with a light incident surface, a first principal surface, and a second principal surface; and printing a plurality of protrusions on at least one of the first principal surface and the second principal surface of the light guide member by gravure offset printing, wherein in the printing, the plurality of protrusions include a first protrusion and a second protrusion, when the first principal surface is viewed in a normal direction, a distance between the light incident surface and the second protrusion is larger than a distance between the light incident surface and the first protrusion, a length of each of the first protrusion and the second protrusion in an orthogonal direction orthogonal to a propagation direction of light incident from the light incident surface increases monotonously in the propagation direction, and a minimum value of the length of the second protrusion in the orthogonal direction is larger than a maximum value of the length of the first protrusion in the orthogonal direction, the first protrusion and the second protrusion each has a trapezoidal shape, the first protrusion has an upper side, a lower side, a right side, and a left side, the upper side and the lower side of the first protrusion being parallel to each other, the second protrusion has an upper side, a lower side, a right side, and a left side, the upper side and the lower side of the second protrusion being parallel to each other, the right side of the first protrusion is aligned with the right side of the second protrusion, and the left side of the first protrusion is aligned with the left side of the second protrusion.

11. The light guide plate manufacturing method according to claim 10, wherein a distance between the upper side and the lower side of the first protrusion is equal to a distance between the upper side and the lower side of the second protrusion.

\* \* \* \* \*